(12) United States Patent
Ortmann

(10) Patent No.: US 8,142,329 B2
(45) Date of Patent: Mar. 27, 2012

(54) CONTROLLING TORQUE IN A FLYWHEEL POWERTRAIN

(75) Inventor: Walter J. Ortmann, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 441 days.

(21) Appl. No.: 12/562,187

(22) Filed: Sep. 18, 2009

(65) Prior Publication Data

US 2011/0071000 A1    Mar. 24, 2011

(51) Int. Cl.
*B60W 10/00* (2006.01)
*B60K 25/10* (2006.01)

(52) U.S. Cl. .......................................... 477/39; 180/165
(58) Field of Classification Search .................. 180/165
See application file for complete search history.

(56) References Cited

U.S. PATENT DOCUMENTS

| | | | |
|---|---|---|---|
| 3,886,810 A | 6/1975 | Sugiyama et al. | |
| 4,233,858 A | 11/1980 | Rowlett | |
| 4,495,836 A * | 1/1985 | Cohen | 475/31 |
| 4,519,485 A * | 5/1985 | Greenwood | 477/2 |
| 4,525,661 A * | 6/1985 | Mucsy et al. | 322/4 |
| 4,591,016 A * | 5/1986 | Matthews | 180/165 |
| 4,625,823 A * | 12/1986 | Frank | 180/165 |
| 4,679,646 A * | 7/1987 | Greenwood | 180/165 |
| 4,724,939 A | 2/1988 | Lockhart et al. | |
| 4,793,454 A | 12/1988 | Petzold et al. | |
| 4,811,225 A | 3/1989 | Petzold et al. | |
| 5,062,049 A | 10/1991 | Taylor | |
| 5,630,773 A | 5/1997 | Slicker et al. | |
| 5,679,099 A | 10/1997 | Kato et al. | |
| 6,027,425 A | 2/2000 | Sakaguchi et al. | |
| 6,488,605 B2 * | 12/2002 | van Druten et al. | 475/207 |
| 6,503,166 B1 * | 1/2003 | Van Druten et al. | 475/210 |
| 6,574,535 B1 | 6/2003 | Morris et al. | |
| 6,702,086 B2 | 3/2004 | Ries-Mueller et al. | |
| 6,962,223 B2 | 11/2005 | Berbari | |
| 7,178,618 B2 * | 2/2007 | Komeda et al. | 180/65.275 |
| 7,258,650 B2 | 8/2007 | Landes | |
| 7,478,693 B1 | 1/2009 | Curtis | |
| 7,513,851 B2 | 4/2009 | Sieffert et al. | |
| 7,540,346 B2 * | 6/2009 | Hu | 180/165 |
| 7,576,501 B2 | 8/2009 | Okubo et al. | |
| 2004/0209732 A1 | 10/2004 | Eguchi et al. | |
| 2008/0105475 A1 | 5/2008 | Hu | |

\* cited by examiner

*Primary Examiner* — Dirk Wright
(74) *Attorney, Agent, or Firm* — David B. Kelley, Esq.; MacMillan, Sobanski & Todd, LLC

(57) ABSTRACT

A method for controlling a powertrain for an automotive vehicle includes determining a desired flywheel torque, determining, with reference to the desired flywheel torque, a desired torque capacity torque of a clutch through which torque is transmitted between the flywheel and wheels of the vehicle, operating the clutch to produce the desired clutch torque capacity, determining a slip error across the clutch, and changing a gear ratio of a continuously variable transmission located in a drive path between the clutch and said wheels to a gear ratio that reduces the slip error.

17 Claims, 3 Drawing Sheets

CONTROLLING TORQUE IN A FLYWHEEL POWERTRAIN

BACKGROUND OF THE INVENTION

1. Field of the Invention

This invention relates generally to a powertrain for a motor vehicle and, more particularly, to controlling torque transmitted between a flywheel and vehicle wheels.

2. Description of the Prior Art

A hybrid vehicle powertrain combines a conventional propulsion system, which includes an internal combustion engine and a step-change automatic transmission, with an energy storage system to improve fuel economy over a conventional vehicle powertrain. Various techniques for regenerating and storing kinetic energy of the vehicle include electric systems, which include an electric motor and electric storage battery; hydraulic systems, which store energy in a pressurized hydraulic tank and flywheel systems, which store energy in a rotating flywheel or disc.

A major challenge present by flywheel systems is the need to provide robustly and smoothly the flywheel torque to the wheels. One way that has been proposed is to determine the wheel torque through the measurement of wheel slip as an input into the control of the flywheel torque delivery to the wheels. This measurement can be difficult since it is very stiff and can change with environmental conditions, creating the need to have very accurate ratio control. Wheel slip is a difficult measurement to make in a vehicle particularly under low loads, and it has a high gain. Small errors in this measurement can cause large control perturbations.

SUMMARY OF THE INVENTION

A method for controlling a powertrain for a motor vehicle includes determining a desired flywheel torque, determining, with reference to the desired flywheel torque, a desired torque capacity torque of a clutch through which torque is transmitted between the flywheel and wheels of the vehicle, operating the clutch to produce the desired clutch torque capacity, determining a slip error across the clutch, and changing a gear ratio of a continuously variable transmission located in a drive path between the clutch and said wheels to a gear ratio that reduces the slip error.

The invention further contemplates a system for transmitting power in a powertrain including a flywheel, vehicle wheels, a clutch through which torque is transmitted between the flywheel and said wheels, a continuously variable transmission located in a drive path between the clutch and said wheels, and a final drive mechanism located in series relation with said transmission in a drive path between said transmission and said wheels.

During vehicle acceleration conditions, the flywheel torque provides added positive torque to supplement powertrain torque transmitted to wheels. During vehicle deceleration conditions, the flywheel provides negative torque to wheels thereby replacing friction wheel brake torque so that kinetic energy of the vehicle is recovered and stored for further vehicle propulsion rather than being wasted through friction in the brake pads.

The output torque of the flywheel is controlled to provide accurate torque to the wheels consistently to meet driver demanded wheel torque. The torque demand of the driver is the combination of the output of the base powertrain plus the torque output of the flywheel.

The method employs easy to measure input speed signals rather than wheel slip signals. Open loop control of the flywheel output torque reduces fluctuation of torque at the wheels. Closed loop control of clutch slip causes only minor perturbations to the output torque.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
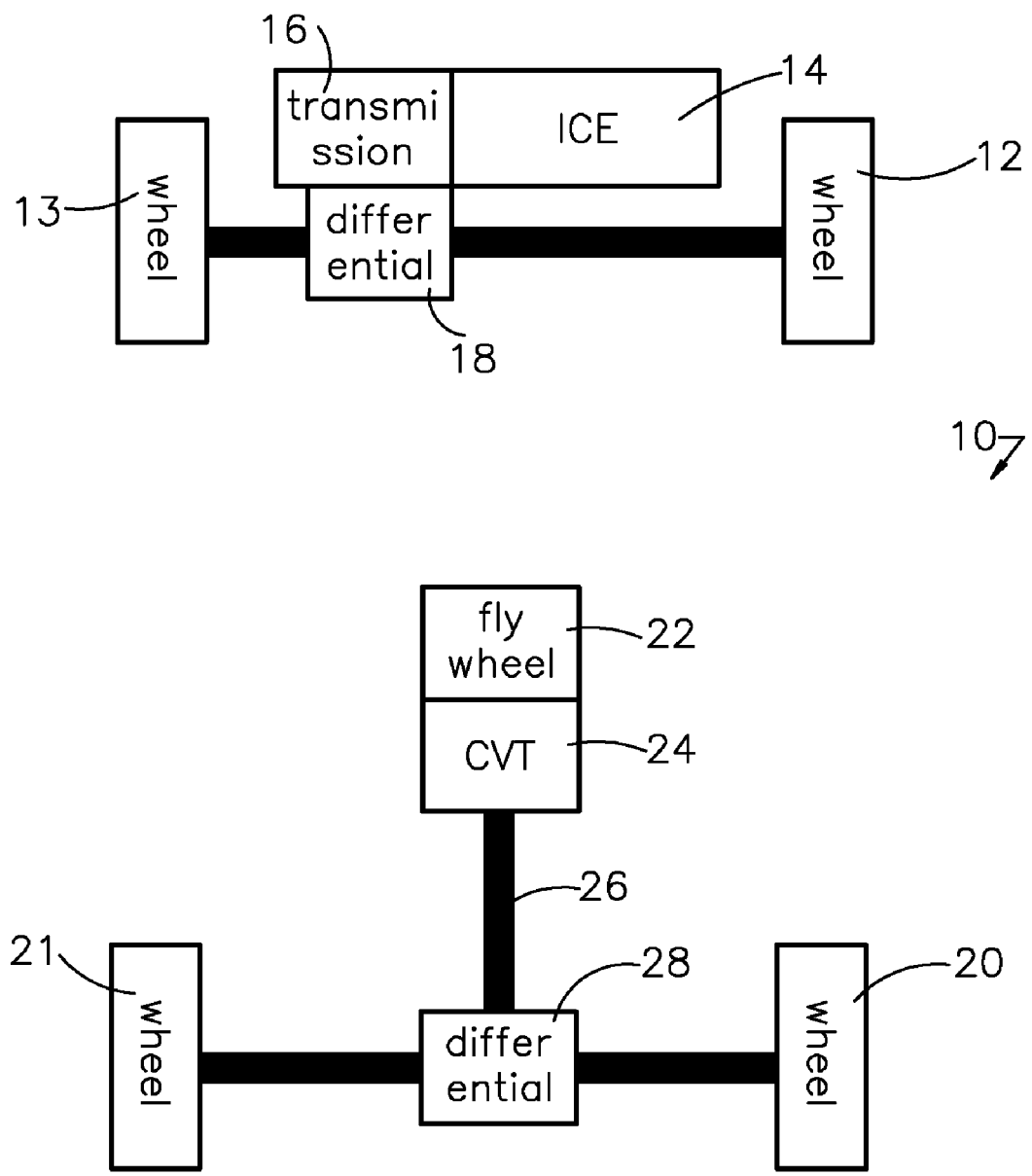
FIG. 1 is schematic diagram of a flywheel hybrid powertrain.

Referring now to the drawings, FIG. 1 illustrates schematically a hybrid powertrain 10 for a motor vehicle. The front wheels 12, 13 are driveable connected to a power source 14, such as an internal combustion engine (ICE) through a transmission 16, preferably a multiple-speed step change transmission, and a front differential mechanism 18. The rear wheels 20, 21 are driveable connected to a hybrid power source, such as a flywheel assembly 22, through a transmission 24, preferably a continuously variable transmission (CVT), driveshaft 26 and rear differential mechanism 28. The CVT 24, which produces a stepless, continuously variable ratio of the speed of its input to the speed of its output. Belt drive mechanisms and traction drive mechanisms are used to transmit power through the CVT 24.

In this hybrid powertrain 10, wheel braking energy is regenerated and stored mechanically in flywheel 22. The speed ratio of the CVT 24 is varied to allow rotating energy to be either stored in the flywheel 22 or released from the flywheel and transmitted to the wheels 20, 21 within the operating range of the CVT.

Figure 2:
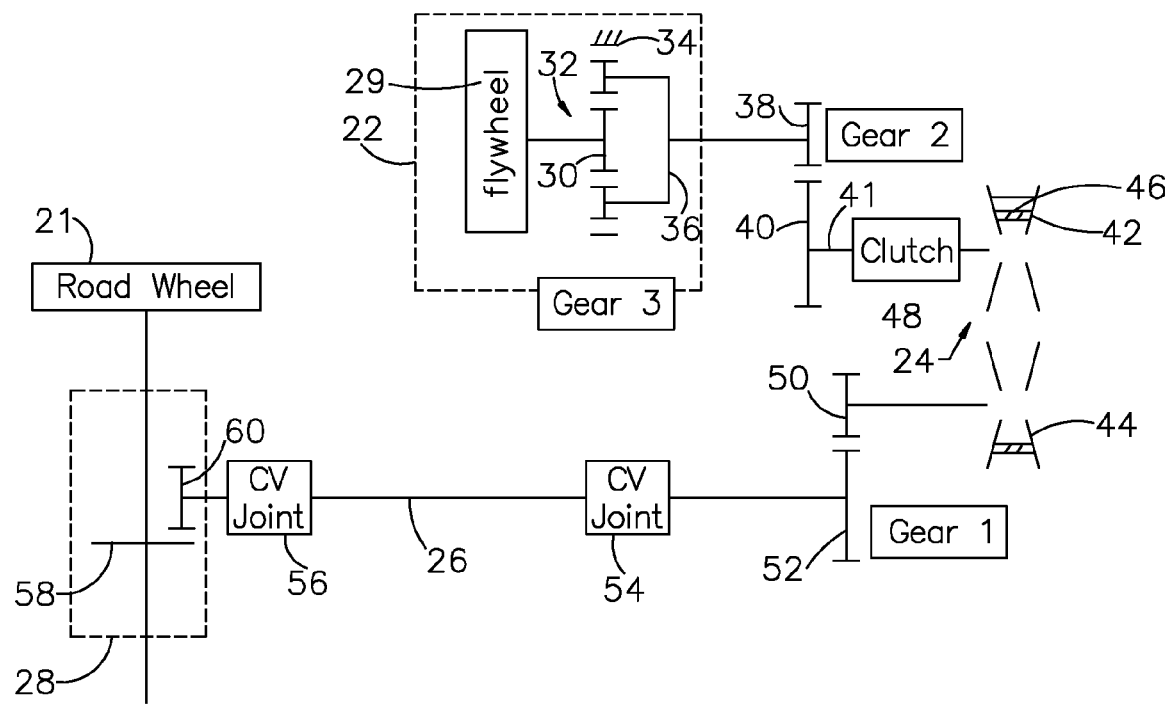
FIG. 2 is schematic diagram showing fixed ratio gearing and a continuously variable transmission in the powertrain.

FIG. 2 shows an example of possible speed ratios for a given application. The flywheel assembly 22 includes a flywheel 29 connected to the sun gear 30 of a simple planetary gearset 32, which further includes a ring gear 34, fixed against rotation, a carrier 36, and planet pinions 36, supported on the carrier and meshing with the sun gear and ring gear. The speed ratio produced by gearset 32 is preferably about 5.07. Planetary gearset 32 is referred to as Gear 3.

Carrier 36 is connected to a gear 38, which meshes with a pinion 40. Preferably, gear 38 rotates about 2.6 times faster than pinion 40. Pinion 40 and gear 38 are collectively referred to as Gear 2. Flywheel torque is the torque transmitted on shaft 41.

Pulleys 42, 44 are driveably connected by a drive belt 46, whose radial position on the pulleys varies. The CVT ratio varies in the preferred range between 2.54 and 0.42. Clutch 48 driveably connects pulley 42 and pinion 40.

Pulley 44 is connected to a gear 50, which meshes with a pinion 52. Preferably, gear 50 rotates about 1.59.6 times faster than pinion 52. Pinion 52 and gear 50 are collectively referred to as Gear 1.

Driveshaft 26, which includes two constant velocity (CV) joints 54, 56, is driveably connected to the ring gear 58 of rear differential mechanism 28 through a pinion 60. The rear differential mechanism 28 produces a final drive ratio of about 3.58

Clutch torque capacity is the variable magnitude of torque transmitted the clutch in any of its operating conditions i.e., slipping, partially engaged, or fully engaged.

Assuming uniform pressure across the friction surfaces of the clutch, $$\text{Torque}=N_{surfaces}*F_{clutch}*mu*(D_{outer}{}^3-D_{inner}{}^3)/3*(D_{outer}{}^2-D_{inner}{}^2)) \quad (1)$$

wherein Torque is clutch torque capacity, $F_{clutch}$ is the magnitude of force applied normal to each friction surface of the clutch, mu is the coefficient of friction, N is the number of clutch friction surfaces, $D_{outer}$ is the outer diameter of the friction surfaces, and $D_{inner}$ is the inner diameter of the friction surfaces.

The force on the servo piston that activates the clutch is a function of the hydraulic pressure applied to the piston, $$F_{piston}=\text{Pressure}*Pi*(D_{outer\,piston}{}^2-D_{inner\,piston}{}^2)/4 \quad (2)$$

wherein $F_{piston}$ is force on the servo piston, $D_{outer\,piston}$ is the outer diameter of the piston surface, and $D_{inner\,piston}$ is the inner diameter of the piston surface. Therefore, the torque capacity of clutch 48 is a function of the variable pressure on the actuating servo piston. Pressure refers to the net pressure on the servo, i.e. the actual pressure minus the pressure needed to overcome the servo return springs.

From FIG. 2, the output torque transmitted to wheels 20, 21 is a function of clutch torque $$T\text{output}=T\text{clutch}*CVT\text{ ratio}*\text{Gear 1 Ratio}*FD\text{ ratio} \quad (3)$$

Based on the piston and clutch geometry, the clutch pressure-clutch torque relationship can be established. To control the flywheel torque, the clutch pressure is controlled to provide the desired output torque.

In addition to the output torque, the slip across clutch 48 is controlled. By controlling clutch slip, the flywheel 29 will be either collecting energy or releasing energy. The direction of the energy flow depends on the direction of the clutch slip. Positive clutch slip occurs when the Gear 2 side of clutch 28 rotates faster than the CVT side of the clutch. Positive slip will result in energy being transmitted from flywheel 29 to the wheels 20, 21 as the speed of the flywheel decreases. Negative clutch slip occurs when the CVT side of clutch 28 rotates faster than the Gear 2 side of the clutch. Negative slip will result in rotating energy being stored in flywheel 29 as its speed increases.

Figure 3:
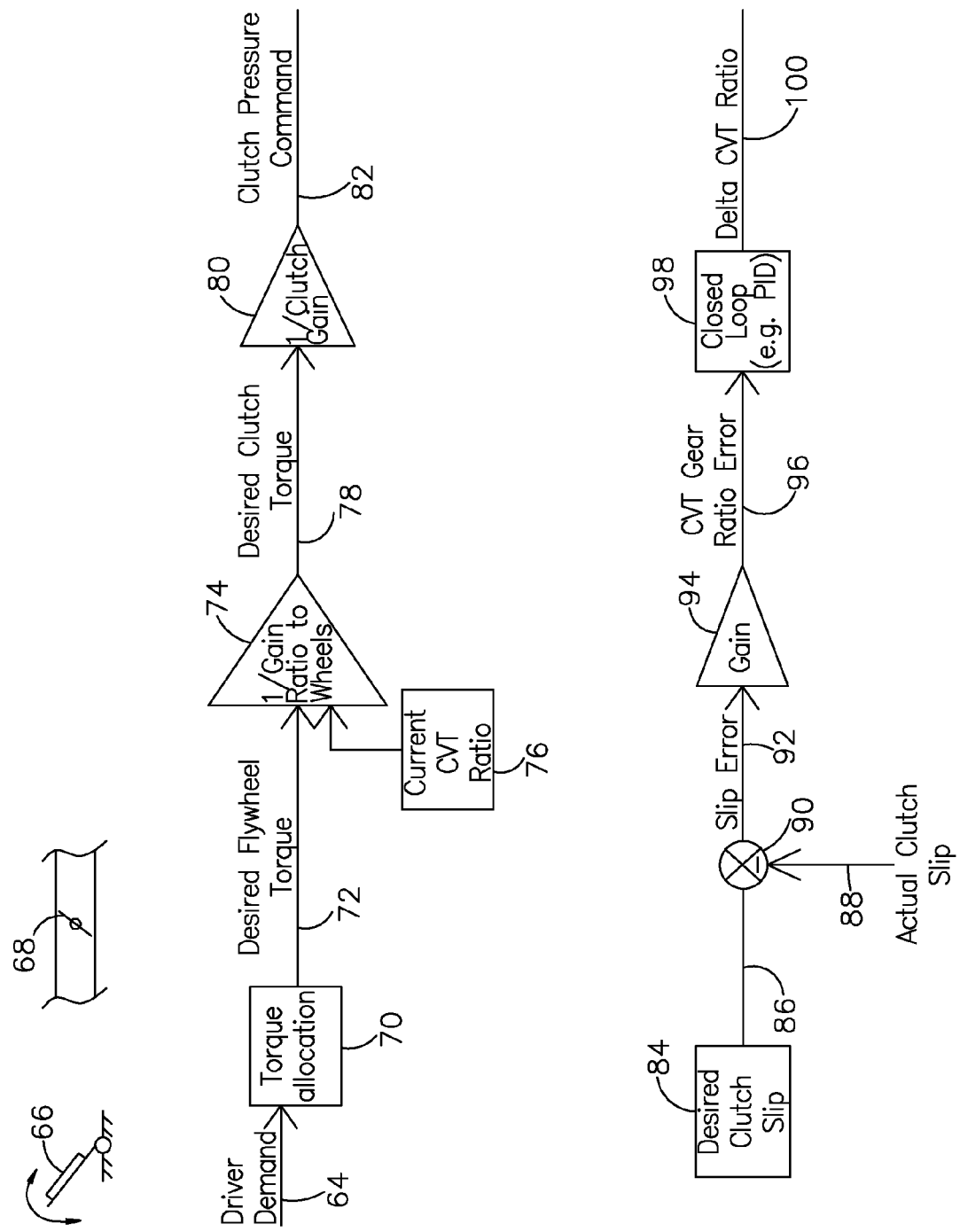
FIG. 3 is a block diagram of a method for controlling torque in the powertrain of FIGS. 1 and 2.

FIG. 3 illustrates a block diagram of the steps of the control method, which eliminates need to use wheel slip as the input variable to control the flywheel torque to the wheels. Instead, to maintain clutch slip, the CVT ratio is adjusted through closed loop control of clutch slip.

Driver demand 64, represented by the degree of displacement of the accelerator pedal 66 or displacement of the engine throttle 68, is used as a reference to determine from a torque allocation variable 70, the desired flywheel output torque 72.

At step 74, the desired flywheel output torque 72 is divided by the CVT ratio and the gear ratio of the powertrain components in the power path between the wheels and the CVT pulley 44, i.e., the product Gear 1 Ratio*FD ratio, to determine the desired torque capacity 78 of clutch 48.

At step 80, the desired torque capacity 78 of clutch 48 is divided by the gain of the clutch (clutch torque per pressure unit) to determine the magnitude of pressure 82 with which to actuate the clutch and produce the desired clutch torque capacity 78.

A function 84 stored in electronic memory produces as output a signal representing the desired clutch slip 86 that corresponds to the current operation conditions. Desired clutch slip 86 preferably has a low magnitude because slip represents energy loss that heats the friction surfaces of clutch 48.

The difference between measured or actual clutch slip 88 and desired clutch slip 86 is determined at summing junction 90, whose output is the slip error 92, which is multiplied by the gain 94 of the CVT 24 (CVT gear ratio per unit of clutch slip) to determine the CVT ratio error 96.

A closed loop controller 98, preferably a PID controller, receives as input the CVT ratio error 96 and produces as its output a command signal 100 representing a change in CVT ratio that will minimize the slip error 90. In response to command signal 100, the radii at which drive belt 46 engages pulleys 42 and 44 of the CVT 24 are changed, such that the CVT ratio is changed by the magnitude of the commanded change in CVT ratio 100.

In accordance with the provisions of the patent statutes, the preferred embodiment has been described. However, it should be noted that the alternate embodiments can be practiced otherwise than as specifically illustrated and described.

The invention claimed is:

1. A method for controlling an automotive vehicle powertrain, comprising the steps of:
   (a) producing a desired torque capacity in a clutch through which torque is transmitted between a flywheel and vehicle wheels; and
   (b) reducing a slip error across the clutch by adjusting a gear ratio of a continuously variable transmission located in a drive path between the clutch and the wheels.

2. The method of claim 1, wherein step (a) further comprises:
   using a driver demanded wheel torque to determine a desired flywheel torque; and
   using the desired flywheel torque to determine the desired torque capacity of the clutch.

3. The method of claim 2, wherein step (a) further comprises using displacement of one of an accelerator pedal and an engine throttle to determine the desired flywheel torque.

4. The method of claim 1, wherein step (a) further comprises using a current gear ratio produced by the transmission and a desired flywheel output torque to determine the desired torque capacity of the clutch.

5. The method of claim 1, wherein step (a) further comprises:
   changing the clutch torque capacity to the desired clutch torque capacity; and
   transmitting torque through the clutch.

6. The method of claim 1, wherein step b) further comprises:
   determining a desired clutch slip;
   determining a current clutch slip; and
   determining the slip error across the clutch as the difference between the desired clutch slip and the current clutch slip.

7. The method of claim 1, wherein step (b) further comprises:
   using a controller to determine from the slip error a change in gear ratio produced by the transmission that reduces the slip error.

8. A method for controlling an automotive vehicle powertrain, comprising the steps of:
   (a) producing a desired torque capacity in a clutch through which torque is transmitted between the flywheel and wheels of the vehicle at a magnitude corresponding to a desired flywheel torque;
   (b) determining a slip error across the clutch; and
   (c) using a continuously variable transmission located in a drive path between the clutch and said wheels to reduce the slip error.

9. The method of claim 8, wherein step (a) further comprises using a driver demanded wheel torque to determine the desired flywheel torque.

10. The method of claim 8, wherein step (a) further comprises using a current gear ratio produced by the transmission and a desired flywheel output torque to determine the desired torque capacity of the clutch.

11. The method of claim 8, wherein step (a) further comprises:
   changing the clutch torque capacity to the desired clutch torque capacity; and
   transmitting torque through the clutch.

12. The method of claim 8, wherein step (b) further comprises:
   determining a desired clutch slip;
   determining a current clutch slip; and
   determining the slip error across the clutch as the difference between the desired clutch slip and the current clutch slip.

13. The method of claim 8, wherein step (c) further comprises:
   using a controller to determine from the slip error said change in gear ratio produced by the transmission.

14. A system for transmitting power in a powertrain for an automotive vehicle, comprising:
   a flywheel;
   vehicle wheels;
   a clutch through which torque is transmitted between the flywheel and said wheels;
   a continuously variable transmission located in a drive path between the clutch and said wheels;
   a final drive mechanism located in series relation with said transmission in a drive path between said transmission and said wheels.

15. The system of claim 14, further comprising:
   a first gear driveably connected to the transmission; and
   a first pinion meshing with the first gear and driveably connected to the final drive mechanism.

16. The system of claim 14, further comprising:
   a planetary gearset including a sun gear secured to the flywheel, a ring gear fixed against rotation, a carrier, and planet pinions supported on the carrier and meshing with the sun gear and ring gear, the carrier being driveably connected to the clutch.

17. The system of claim 16, further comprising:
   a second gear driveably connected to the carrier; and
   a second pinion meshing with the second gear and driveably connected to the clutch.

* * * * *